Dec. 31, 1929.  A. FAY  1,741,763
APPARATUS FOR OPERATING UPON COMPOSITE SUBSTANCES
Filed Dec. 8, 1927
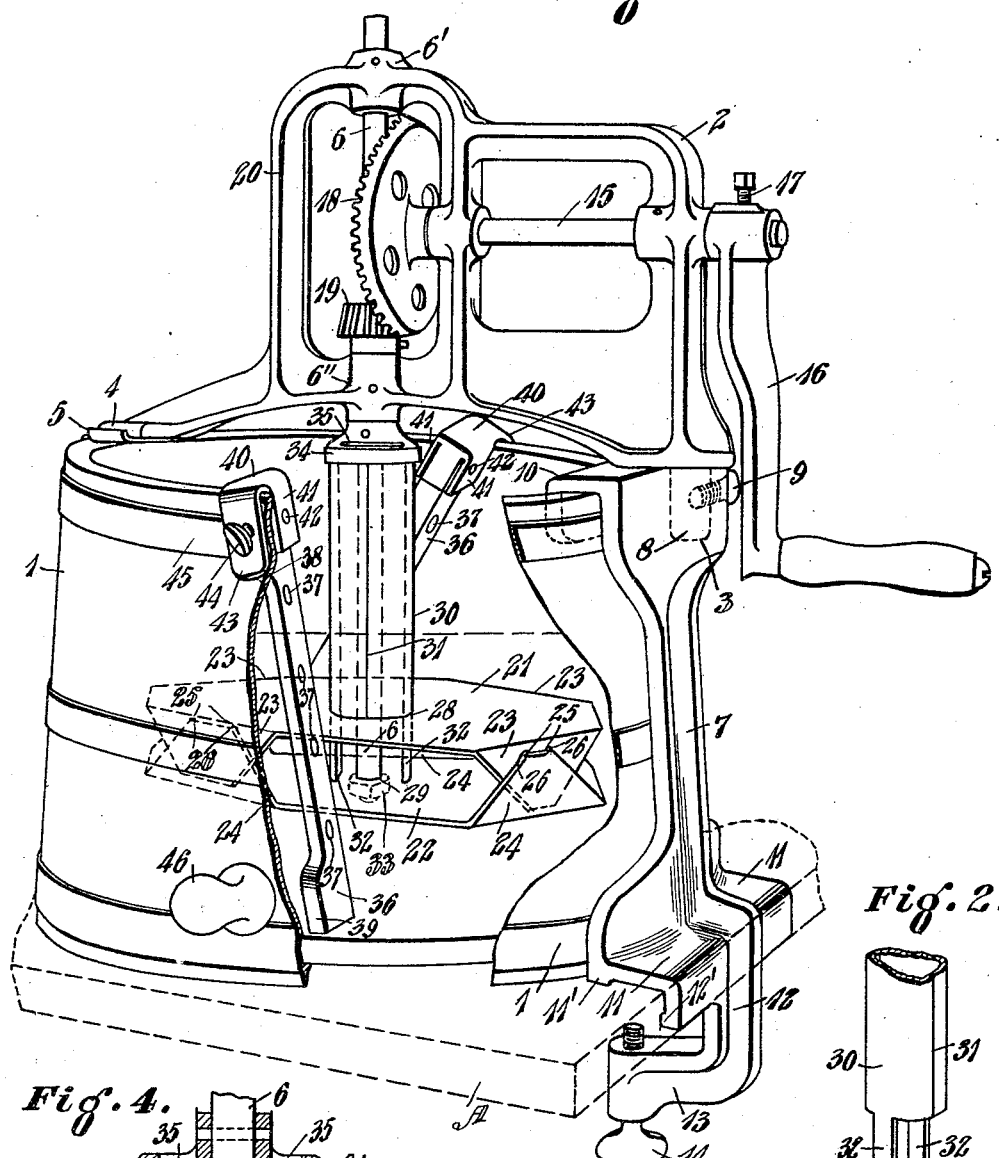

Patented Dec. 31, 1929

1,741,763

UNITED STATES PATENT OFFICE

ALPHEUS FAY, OF LOUISVILLE, KENTUCKY

APPARATUS FOR OPERATING UPON COMPOSITE SUBSTANCES

Application filed December 8, 1927. Serial No. 238,670.

The object of my invention is to provide a novel method and means to operate upon a comparatively broad shallow body of a composite substance containing butter fat, with the vertical pressure, peripheral pressure and the peripheral surface of said body minimized; and the upper surface, the lower surface and the peripheral diameter of said body maximized to allow said body to partake freely of undulatory movement by rotatable members with their thickness and their peripheral surfaces minimized and their upper surfaces and lower surfaces and diameter maximized; with the peripheries of said members moving in close proximity with the inside walls of said vessels, the distance from the center to the periphery of said members being greater than the distance from the peripheries of the said members to the inside walls of the vessel; said members rotating said body in the same direction as said members but at a slow velocity compared with the velocity of said members, said vessel having its walls converged with a broad width and a shallow depth to allow the substance in the vessel to rise and fall freely to be acted upon to produce mechanical and chemical changes through its rates of vibrations in the substance, until the cream elements coincidentally change to binominal quantities.

A further object of my invention is to provide a novel method for separating whole butter from sweet or sour cream with a hollow disk having plane surfaces.

A further object of my invention is to simplify the construction of apparatus of the above character, thereby making it more economical of production; and also to make the apparatus readily disassembled for storage and shipping, yet very substantial and reliable when assembled for use; and to make each part so that when it is detached from the other parts it will be very readily cleaned, so that the entire apparatus may be kept thoroughly sanitary in use. Other objects will appear in the course of the ensuing description.

I attain these objects by the apparatus illustrated in the accompanying drawing, in which—

Figure 1 is a general perspective view, with part of the vessel broken away to reveal the interior details, and an object on which the apparatus is mounted shown by dotted lines;

Fig. 2 is a detail perspective view of part of the tubular shaft;

Fig. 3 is a partial plan view of the upper impeller member; and

Fig. 4 is a vertical cross section of the impeller member and its shafts, intermediate parts being broken away for lack of space.

The vessel 1 for containing the composite substance to be operated upon is of wide and low formation providing an ample base, so that it is readily secured firmly to a table or the like. The wide and low formation of the vessel in addition provides for preventing the substance from becoming deep in proportion to its diameter, according to the method set forth and claimed in my prior Patent No. 1,210,782, issued January 2, 1927.

The bracket 2 is mounted across the top of the vessel 1 and has at one end a lug 3 extending down from its bottom outside the rim of the vessel; and at its other end it has a straight flat part 4 which fits in a channel 5 secured on the rim of the vessel; this channel preferably being made as disclosed and claimed in my prior Patent No. 1,197,114, issued September 5, 1916. The inner impeller shaft 6 is journaled vertically in upper and lower bearings 6' and 6'', respectively, at the middle of the bracket.

The arm 7 is detachably secured to the bracket 2 by having a socket 8 receiving the lug 3 of the bracket, and a set screw 9 screwed through the side of the socket against the lug. This arm 7 has a channel 10 extending in from the socket 8 to fit snugly over the rim of the vessel 1, and this arm 7 extends down along the side of the vessel, with a shoulder 11. This shoulder 11 is broader than the arm 7, with lugs 11' at opposite ends, that preferably lie slightly above the bottom of the vessel 1 when the channel 10 fits properly on the rim. From this shoulder 11 a continuation 12 of the arm 7 extends down out past the edge of the object A, such as a table, that supports the apparatus, terminating in a head 13 that extends under the object A. This head 13 has a thumb screw 14 threaded up through it to clamp against the under side of the object A. This continuation 12 also is widened, with lugs 12′ at opposite ends, bearing on the edge of the object A. These prevent sidewise swinging of the device. This is an improvement on the device claimed broadly in my prior Patent No. 1,210,780, issued January 2, 1917.

The vessel 1 is clamped firmly to the bracket 2 and arm 7, and all of these are clamped firmly to the object A, upon tightening the single screw 14; the bracket 2 having been secured in the socket 8 by the screw 9. At the same time the bracket 2 may readily be removed from the vessel 1 by loosening the screw 9, without disturbing the connection to the object A by the screw 14. Also, it is impossible to secure the bracket 2 firmly to the arm 7 until the latter has been secured firmly to the object A. It has been found that, without this, users often attempt to operate the apparatus without first securing it firmly to the table, resulting in ineffective operation, owing to inefficient application of the driving power with one hand while attempting to hold the apparatus with the other hand.

A shaft 15 is journaled horizontally in the bracket 2 about midway between the upper and lower bearings 6′ and 6″, extending out over the arm 7 and having a crank 16 fixed on it by a set screw 17, and having a bevel gear 18 meshing with a bevel pinion 19 pinned on the impeller shaft 6 near bearing 6″. The bracket 2 has the extension 20 around these gears 18 and 19, reinforcing the bracket and acting as a guard for the gears.

The shaft 6 extends down into the vessel 1 and carries an impeller in the form of plane polygonal members 21 and 22, each made of a substantially square sheet of metal with its corners bent to form triangular sides 23 and 24, respectively; the members being inversely assembled with their sides 23 and 24 together and overlapping. Preferably, two opposite sides 23 of the upper member lap outside the adjacent two opposite sides 24 of the lower member, while the other two opposite sides 24 of the lower member lap outside the other two opposite sides 23 of the upper member; and the outer sides have lugs 25 fitting in slots 26 of the inner sides, springing in and out, in assembling or disassembling the members, by virtue of the resiliency of the sheet metal. The above arrangement permits these outer parts to be formed identically in both members 21 and 22 and results in a symmetrical assemblage thereof, to operate more steadily and uniformly upon the substance.

The central parts of the two members 21 and 22 differ from each other, however; the upper member 21 having a relatively large central opening 27 with diametrically opposite recesses, or keyways 28 (Fig. 3) while the lower member 23 has merely a round opening 29 receiving the lower end part of the shaft 6 snugly. The outer tubular shaft 30 is formed from a rectangular piece of sheet metal bent around with edges abutting in a seam 31 and having integral with its lower edge the legs 32 so positioned thereon that they will be diametrically opposite to each other and about ninety degrees around the tube from the seam 31 when the tube is completed (Fig. 2). The diameter of the large opening 27 of the upper impeller member 21 is substantially that of the inner diameter of the tubular shaft 30, so that the lower edge of this shaft rests on the top of this member 21 close around the edge of this opening 27, and the legs 32 fit snugly in the recesses or keyways 28. These legs 32 are made of such length that their bottoms will rest firmly against the upper surface of the lower member 22 when the two members fit together with their lugs 25 and recesses 26 engaged as before described. The lower end of the shaft 6 is threaded, and a nut 33 is screwed thereon up against the bottom of the lower member 22, clamping it tightly against the legs 32, which thus prevents the central part of the lower member 22 from collapsing upward under pressure of the nut. At the same time the sides 24 of the lower member 22 are clamped tightly against the bottom of the upper member 21 and the sides 23 of the latter tightly against the top of this lower member 22; the tubular shaft 30 being clamped tightly up against the ferrule 34, pinned to the shaft 6 and having a hub bearing up against the bottom of the lower bracket bearing 6″ and a rim with a flange fitting snugly over the top of the tubular shaft 30, between which rim and hub the ferrule has opposite openings 35, admitting air freely down into the tubular shaft, as in my prior patents mentioned.

By having the legs 32 spaced around away from the seam 31, the tube is kept firmly closed at this seam by virtue of these legs engaging out in the keyways 28; and by having these legs 32 down against the lower impeller member 22, the latter is firmly braced at its center, against the clamping pressure, which thus may be very strong, to hold the parts together with great firmness. Yet all of these parts, the inner shaft 6, tubular shaft 30, and upper and lower impeller members 21 and 22, may readily be taken apart, upon which each is entirely open and free for access of cleaning means, permitting the device easily to be kept in sanitary condition, as is essential in operation upon milk products or other foodstuffs.

To prevent the liquid substance from rotating freely with the impeller, brakes 36 are mounted adjacent to the vessel walls at substantially diametrically opposite sides thereof, each preferably comprising a strip of wood having apertures 37 at intervals of its length, and having its side next to the vessel wall recessed so as to leave bearing lugs 38 and 39 at upper and lower ends only. These strips are made a little higher than the vessel walls, and have their upper ends clamped to the vessel and their lower ends against the bottom of the vessel, the strips inclining over in the direction of rotation of the impeller so that impact of the liquid thereagainst presses them the more firmly in fixed position. These brakes are similar to brakes disclosed in my prior patents mentioned; but I have improved their connections to the vessel rim. Each connection comprises a T-shaped piece of sheet metal with all of the three members bent down substantially parallel with each other so that there is a top 40, two sides 41 to flank the upper end part of the brake strip, with a rivet 42 through them and the strip, and the third side 43, which was the stem of the T, spaced out from the edges of the sides 41 to hook down over the rim of the vessel, and having a thumb screw 44 threaded in through it to engage with the upper hoop 45 of the vessel, thereby firmly clamping the brake to the vessel, and by the screw 44 engaging the metal hoop rather than the wood of the vessel, avoiding marring of the latter and permitting a firmer holding effect.

At its bottom, the vessel 1 has an outlet opening through its wall, closed by a plug 46, so that the vessel may be emptied without removing it from the table; the vessel having this outlet about ninety degrees around from the arm 7 when properly mounted on the table, and preferably being mounted next to one corner of the latter, as shown in Fig. 1, so that the outlet is close to one edge of the table, to discharge into a vessel held thereat.

For separating butter from either sweet or sour cream, the liquid is placed in the vessel 1 to about the height of the heavy dotted line in Fig. 1, with the impeller about midway of the depth of the liquid as shown. The milk elements should not have their temperature much lower than 55° F. nor much greater than 60° F., so that the operation may be performed quickly, but not at such a high temperature as to have the butter granules too soft. With this method, which substantially is that of my prior patent mentioned, butter may be produced in from three to ten minutes; perceptible accumulation of the butter practically all taking place during the last 15 to 60 seconds of operation. The butter will form in granules, and then the residue may be drawn off from the vessel and the granules salted by agitation and aeration of brine within the granules in the vessel. When the salting is completed thus, the granules may be removed, either before or after draining the brine from the vessel. It will be understood that the amount of salting is governed by the length of time the granules and brine are agitated together.

In the above operation to extract the butter from the milk elements, the centrifugal action of the impeller, comprising the plane disks with the sides presented substantially edgewise to the circle of rotation, forces the substance particles certrifugally outward without appreciable impact and disruptive action, and draws the elements of the atmosphere in through the tubular shaft 30, forcing these out with substance particles, changing the rates of vibrations of the latter, gradually raising the butter particles to the top of the body of substance, diminishing the motion of the surface of the body of substance, at which the butter particles are concentrated, until they coincidentally separate entirely from the residue and form into whole grains, in such a condition that no working, after salting as above described, is necessary. In my prior disclosures I have given directions for working the granules as a final step, to reduce the butter to the compact solid condition usual in the art. However, my method, as now developed, permits this to be dispensed with, and the butter may be marketed in whole condition, just as it collects as a result of the above described process, in its pure, fresh condition, easily spread when used, and stored in bulk and dispensed in containers such as paper buckets; the storage temperature being low enough to preserve the butter, yet preferably not such as to greatly harden it. The comparatively loose granular condition is such that, although the granules may be somewhat hardened, the mass as a whole is easily scooped and packed as above mentioned, with the convenience in final serving and spreading as described.

The efficiency of operation is such that fully 90% of the butter fat of the cream is removed, and butter of purity of over 99% is obtainable, of firm texture and natural flavor, which purity and texture and flavor are conserved by delivering the butter in the unworked, whole condition just described. Such efficiency and purity are due to the method of my prior Patent No. 1,210,782 before mentioned, and the conservation thereof with better facility is due to the specified step of delivery in conjunction with the steps of said method, constituting a new method of producing butter, by which a new product, which I term "whole butter" is provided, having the advantages just pointed out. The present improved apparatus, by its firm assemblage, ready disassemblage and cleaning, and insurance of effective operation by the user, contributes to the successful practice of this method, a primary object of which is the quick production of a butter of great purity and naturalness, and economy of materials required in addition to the saving of time in assembling, cleaning and operating the apparatus.

Certain details of construction of the apparatus, and of operation and method of use, have been somewhat specifically described, but modifications, within the scope of the invention, may occur in practice, to meet various conditions, and I therefore do not wish to be understood as being limited to the precise disclosures herein, but having thus fully described my invention, as is required, what I claim as new and desire to secure by Letters Patent is:

1. In apparatus for operating upon composite substances, in combination with a vessel, a bracket comprising a main part extending across the top of the vessel and forming supporting and bearing means for the operating mechanism of the apparatus, means detachably secured to one end of said main part, having a channel fitting over the rim of the vessel, means on said vessel across from said channel, having an upwardly opening channel formation, said main part of the bracket having a part fitting in said channel formation, and the means that has the channel over the rim of the vessel extending down outside said vessel and having a shoulder near the bottom of the vessel to bear on top of suitable supporting means for the apparatus, and having clamping means spaced down from and extending under this shoulder, under said vessel, to bear up against the bottom of the supporting means.

2. In apparatus for operating upon composite substances, in combination with a supporting shaft, an impeller, means for holding said impeller upwardly on said shaft, a tubular shaft for said impeller detachably engaging therewith and having an open upper end and means for holding the impeller and this tubular shaft down on the supporting shaft, said impeller comprising upper and lower detachable members, the upper member having an opening larger in diameter than that of the supporting shaft, with recesses in its edges, and said tubular shaft having legs engaging in said recesses and extending down against said lower member.

3. In apparatus for operating upon composite substances, a clamping device for a brake therein comprising a T-shaped piece bent with its members substantially parallel with each other, the stem part of the T being spaced out from the other two members to fit over the rim of a vessel and having means movable thereon to engage part of the vessel, and the other two members forming sides of a socket to receive the end part of the brake.

4. In apparatus for operating upon composite substances, in combination with a vessel, a bracket comprising a main part to overlie the vessel, and means detachably secured to one end of this main part, bearing on the rim of the vessel and extending down outside the vessel and having a shoulder near the bottom of the vessel to bear on top of suitable supporting means, said shoulder being widened to extend along the top and edge of the supporting means, and clamping means below said shoulder to gear up against the bottom of the supporting means.

5. In apparatus for operating upon composite substances, in combination with a vessel and a brake to be held upright therein adjacent to the inner wall thereof, clamping means formed of a T-shaped piece with the members bent substantially parallel with each other, the stem part of the T being spaced out from the edges of the other members to fit over the vessel rim and having means movable thereon to engage part of the vessel, and the other two members forming sides of a socket, the upper end of said brake fitting in said socket and being secured to said sides, and the lower end of said brake bearing tightly against the bottom of the vessel whereby said clamping means holds said brake in position in said vessel.

ALPHEUS FAY.